US007004037B2

(12) United States Patent
Andresen et al.

(10) Patent No.: US 7,004,037 B2
(45) Date of Patent: Feb. 28, 2006

(54) FLOW METER DEVICE

(75) Inventors: Rikke Vesterbaek Andresen, Sydals (DK); Steen Skytte Jensen, Augustenborg (DK); Hans Christian Moeller, Augustenborg (DK)

(73) Assignee: Siemens Flow Instruments A/S, Nordborg (DK)

( * ) Notice: Subject to any disclaimer, the term of this patent is extended or adjusted under 35 U.S.C. 154(b) by 0 days.

(21) Appl. No.: 11/056,281

(22) Filed: Feb. 14, 2005

(65) Prior Publication Data

US 2005/0252307 A1 Nov. 17, 2005

Related U.S. Application Data

(63) Continuation of application No. PCT/DK03/00534, filed on Aug. 12, 2003.

(30) Foreign Application Priority Data

Aug. 14, 2002 (DE) ............................... 102 37 209

(51) Int. Cl.
*G01F 1/84* (2006.01)

(52) U.S. Cl. ................................................ 73/861.355

(58) Field of Classification Search ........... 73/861.354, 73/861.355, 861.356, 861.357, 195, 196, 73/197, 198; 702/45, 54
See application file for complete search history.

(56) References Cited

U.S. PATENT DOCUMENTS 4,703,660 A 11/1987 Brenneman
4,781,069 A 11/1988 Mitzner
4,811,606 A 3/1989 Hasegawa et al.
5,054,326 A 10/1991 Mattar
6,199,022 B1 * 3/2001 Cunningham ................ 702/54
6,233,526 B1 * 5/2001 Cunningham ................ 702/45
6,666,098 B1 * 12/2003 Drahm et al. .......... 73/861.355
2002/0178803 A1 12/2002 Pelletier et al.

FOREIGN PATENT DOCUMENTS

| | | |
|---|---|---|
| DE | 30 07 361 C3 | 9/1980 |
| DE | 198 31 505 C2 | 1/2000 |
| EP | 0 462 711 A1 | 12/1991 |
| WO | WO 92/19940 | 11/1992 |
| WO | WO 98/40702 | 9/1998 |
| WO | WO 01/51898 A | 7/2001 |
| WO | WO 01/78808 A1 | 10/2001 |

OTHER PUBLICATIONS

W. Kiehl, Difference measurement using Coriolis mass flowmeters, Flow Meas. Instrum., Apr. 1991, vol. 2, pp. 135-138.

* cited by examiner

*Primary Examiner*—Edward Lefkowitz
*Assistant Examiner*—Corey D. Mack
(74) *Attorney, Agent, or Firm*—Sughrue Mion, PLLC

(57) ABSTRACT

A device having a first flow meter (2) and a second flow meter (3). The first and the second flow meters work according to a Coriolis principle. The first flow meter includes a first measuring tube (7). The second flow meter includes a second measuring tube (10). The first flow meter and the second flow meter are disposed in a common housing (4,5,6). The first flow meter and the second flow meters have different eigenfrequencies because of a first vibration-influencing device (18) attached to the first flow meter and a second vibration-influencing device (19) attached to the second flow meter.

15 Claims, 4 Drawing Sheets

1 3 11 5 6 10 12 9 11 26 25 4 7 8 2

FLOW METER DEVICE

This is a Continuation of International Application PCT/DK2003/000534, with an international filing date of Aug. 12, 2003, which was published under PCT Article 21(2) in German, and the disclosure of which is incorporated into this application by reference.

FIELD AND BACKGROUND OF THE INVENTION

The invention relates to a flow meter device having a first flow meter, which works according to the Coriolis principles and is provided with a first measuring tube, and a second flow meter, which works according to the Coriolis principle and is provided with a second measuring tube.

A flow meter device of this type is known from W. Kiehl, "Difference measurement using Coriolis mass flowmeters," Flow Meas. Instrum., Vol. 2, April 1991, pp. 135 to 138. The use of two Coriolis flow meters is advantageous, for example, whenever the difference between two mass flows is to be determined. Determining this difference is useful if one wants to get information about a leak, for example.

To measure the difference, the first flow meter is used to measure a first mass flow and a second flow meter to measure the second mass flow, and the difference between the two mass flows is then calculated.

To ensure that the conditions created for the two measurements are as similar as possible, the two separate flow meters are usually accommodated in the same housing. To simplify production, the designs of the two flow meters are practically identical. This also facilitates the subsequent analysis of the individual signals.

However, when two identical flow meters are used in the same housing, problems may arise by the two flow meters influencing each other. In flow meters that work according to the Coriolis principle vibrations are produced. These vibrations also act on the measuring tubes. The phase difference between the vibrations along different sections of the measuring tube is a measure of the mass flow. Under unfavorable circumstances, however, these vibrations are also transmitted through the common housing from one flow meter to the other. If both flow meters vibrate at the same frequency, this transmission causes significant interference and can distort the flow measurement results.

OBJECTS OF THE INVENTION

One object of the invention is to avoid crosstalk between the flow meters.

SUMMARY OF THE INVENTION

This and other objects are attained by flow meter devices, such as the ones disclosed, in which the two flow meters are disposed in a common housing and have different eigenfrequencies.

Because of the different eigenfrequencies, the effects of crosstalk are reduced. The different eigenfrequencies make it possible to keep the mutual influence of the two flow meters small enough such that there is no, or only a tolerable level of, interference with the measurement result.

In an embodiment, vibration-influencing device is mounted in a different location on the first measuring tube than on the second measuring tube. Using the vibration-influencing devices on the two measuring tubes, the eigenfrequencies of the flow meters are adjusted differently in relation to each other. The difference between the eigenfrequencies need not be large. It has been shown that an eigenfrequency difference of approximately 10 Hz is sufficient for the effects of crosstalk, i.e., the mutual influence, to become small enough to be negligible.

The use of a vibration-influencing device on each measuring tube is a relatively simple measure. The design of the two flow meters can be practically identical, that is, there is no need to select a different thickness of material for the measuring tube in one flow meter than for the measuring tube in the other flow meter. Nor is it necessary to make any fundamental modifications in the flow meter. Both flow meters can be configured identically with respect to the positioning of the sensors and the exciter. If the two flow meters are identical, or at least practically identical, they also produce readily comparable results.

Preferably, the vibration-influencing device is designed as a passive device. In other words, no additional energy is required to generate different eigenfrequencies in the two flow meters. The structural complexity is also reduced. Passive devices are much simpler to produce than active devices. The active devices require an electromagnet, for example, or some other excitation means.

The two flow meters are preferably identical, with the exception of the vibration-influencing device. This facilitates not only their production, as described above. Only a single type of flow meter needs to be produced. It also facilitates the analysis of the measurement signals because the measurement signals are in principle based on the same conditions.

Preferably, the first and the second measuring tube each have at least two loops that are interconnected by at least one coupling element, such that the coupling element is the vibration-influencing device. The configuration of a flow meter with a single measuring tube having at least two loops is known from WO 92/19940 A1. Between the loops coupling elements are provided whose function is to prevent the two loops from vibrating away from each other during operation. In principle, the coupling elements act as a fixed vibration point or a vibration node. The vibration of the measuring tube is limited to one side of the coupling elements while the other side is largely free from vibrations. This has the advantage that the measuring tube can be connected to a line without the vibrations being transmitted to that line. If the coupling elements can simultaneously be used to generate different eigenfrequencies in the two flow meters, the resulting structure is relatively simple.

Preferably, two coupling elements are provided for each measuring tube. This results in a largely symmetrical configuration relative to the flow through the measuring tube.

The coupling elements on each measuring tube are preferably arranged equidistantly from the ends of the respective measuring tube. This has the particular advantage that the coupling elements on the one measuring tube can be arranged farther away from the ends than those on the other measuring tube. This changes the eigenfrequency in a simple manner. However, the measurement result in the measuring tube itself remains largely unaffected by the coupling elements.

The coupling elements are preferably plates, and the measuring tubes are aligned perpendicularly to the plates in the area of the coupling elements. The rigidity of the plates perpendicular to the direction of movement of the measuring tubes is sufficient to effectively absorb the vibrations. At the same time, due to the relatively high rigidity of the plates, the eigenfrequencies of the measuring tubes are effectively influenced.

The plates of a flow meter are preferably fixed relative to a chassis of this flow meter. The two chassis each have at least two locating positions. The plates of the first flow meter are fixed at a first locating position and the plates of the second flow meter at a second locating position. The same chassis or housing parts can in turn be used. Basically, the difference between the eigenfrequencies of the two flow meters results simply from the fact that the plates are fixed at different positions, i.e., the so-called locating positions in each chassis. This is a relatively simple measure, which does not require any major structural changes in the chassis. This facilitates production since only a single type of chassis needs to be produced.

The locating positions are preferably created by means of structures on the chassis. These structures primarily determine the site of the locating positions. At the same time, structures can also be used to mechanically fix the individual plates or auxiliary elements.

The structures preferably enable an insertion of the plates. This facilitates the assembly. The plates merely need to be inserted into the structure, which defines the respectively desired locating position.

A locating position is preferably defined by at least three projecting parts of the chassis, which protrude toward the measuring tube. The three projecting parts are arranged in a triangle. The plates can then be inserted into the chassis, such that two projecting parts are arranged on one side of the plate and one or more projecting parts on the other side. This configuration adequately secures the plates within the chassis.

The locating positions are preferably spaced apart by a distance on the order of one centimeter. Hence, the distance between the locating positions, that is, the distance between the individual coupling elements can be relatively small. It has been found that even small differences are enough to sufficiently change the eigenfrequencies.

Strain gauges are preferably arranged on each of the coupling elements. These strain gauges are inexpensive. They can register the relative longitudinal change of the coupling elements. This change can be used as a measure of the mass flow. In addition, the measurement by means of strain gauges includes a differential measurement of the curvature of the measuring tubes, such that the dependence on the flow direction can be clearly reduced.

Each flow meter preferably has an electronic control unit, such that the electronic control unit of the one flow meter monitors the electronic control unit of the other flow meter. The two control units can very well be structurally combined, e.g., on a common printed circuit board. However, the printed circuit board is divided into two sections, which are functionally completely separate, such that each section controls one flow meter. Furthermore, the two sections monitor each other by means of a monitoring circuit. If one section fails, the other section will take over the control and measurement. This has the advantage of ensuring a reliable operation even in differential flow measurements, which have to meet high standards.

BRIEF DESCRIPTION OF THE DRAWINGS

The invention will now be described in greater detail, by way of example, with reference to a preferred embodiment depicted in the drawing, in which.

DETAILED DESCRIPTION OF THE PREFERRED EMBODIMENTS

Figure 1:
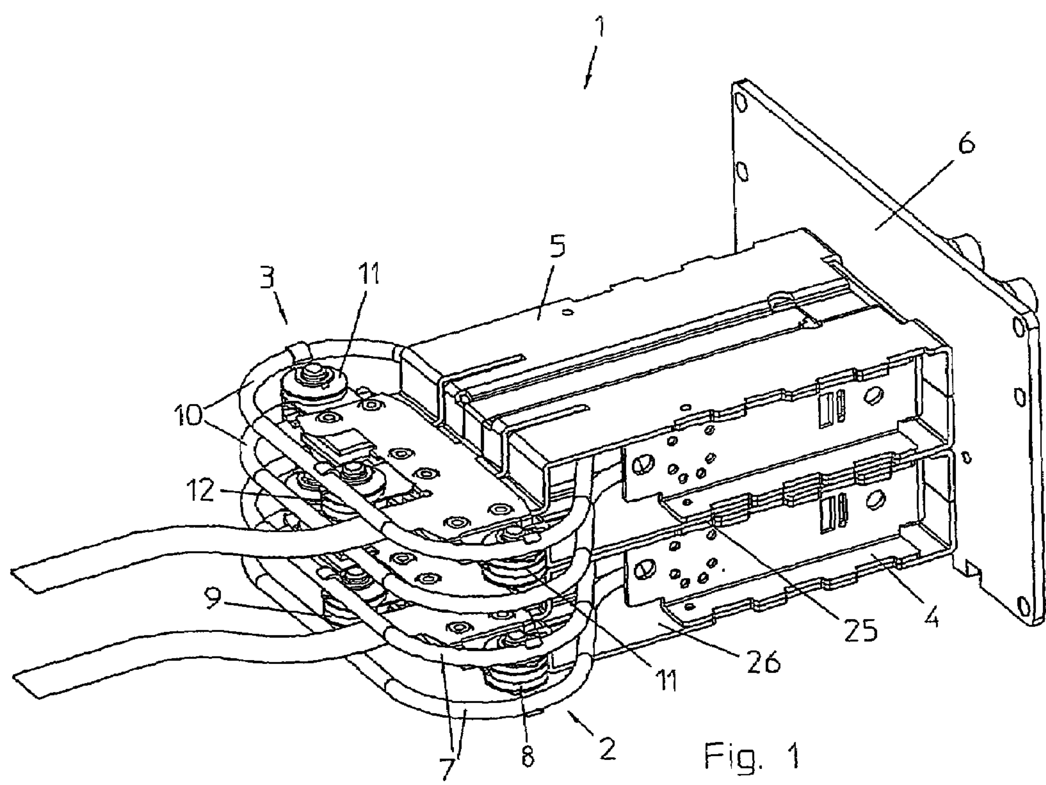
FIG. 1 shows a flow meter device with two flow meters.

A flow meter device 1 depicted in FIG. 1 has two individual flow meters 2, 3, the chassis 4, 5 of which are mounted to a common front plate 6.

The flow meter 2 has a measuring tube 7, which is run in two loops. Sensors 8 and a driver 9 are disposed between the two loops. The flow meter 3 likewise has a measuring tube 10, which is run in two loops. Two sensors 11 and a driver 12 are located between the loops of the measuring tube 10.

The measuring tubes 7, 10 can be formed by parallel loops, that is to say, by two separate measuring tubes through which the fluid flows. It is also possible, however, to design the measuring tubes 7, 10 as continuous tubes as disclosed in WO 92/19940 A1.

Figure 2:
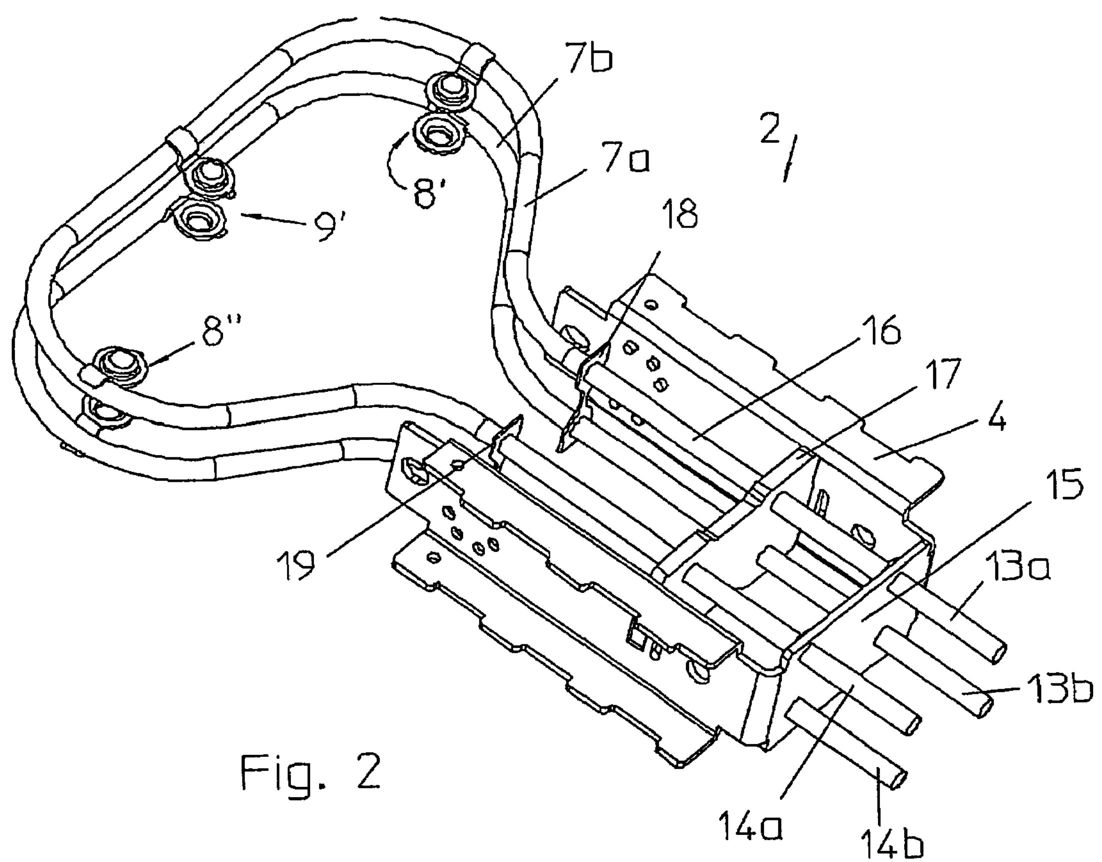
FIG. 2 shows a single flow meter.

FIG. 2 shows an individual flow meter 2 in detail. The two measuring tube loops 7*a*, 7*b* are mounted on the chassis 4. The measuring tube 7*a* has an inlet 13*a* and an outlet 14*a*. The measuring tube 7*b* has an inlet 13*b* and an outlet 14*b*. The inlets and outlets 13*a*, 13*b* and 14*a*, 14*b* are guided through a base part 15 of the chassis 4. Straight sections 16 extend from the inlets 13*a*, 13*b* and the outlets 14*a*, 14*b* and are supported by an anchor 17 behind the base 15. Along the further course of the measuring tubes 7*a*, 7*b* a coupling element 18 is provided for the inlet section 13*a*, 13*b* and a coupling element 19 for the outlet section 14*a*, 14*b*. The coupling elements 18, 19 interconnect the two measuring tubes 7*a*, 7*b* on the outside of the looped section. In the embodiment shown, the fluid can flow parallel through the two measuring tubes 7*a*, 7*b*. It is also possible, however, to connect the two measuring tubes 7*a*, 7*b* in series. For this purpose, the outlet 14*a* of the measuring tube 7*a* is connected to the inlet 13*b* of the measuring tube 7*b*, for example. This connection is preferably effected within the chassis 4.

The position of the coupling elements 18 determines the eigenfrequency of the flow meter 2. If the coupling elements 18, which are designed as plates, are shifted along the measuring tubes 7*a*, 7*b*, the eigenfrequency changes because the distance between a vibration node and the driver 9 is lengthened or shortened. The distance relative to the anchor 17 is likewise shortened or lengthened. The anchor 17 together with the chassis 4 forms a base plate whose mass may be assumed to be approximately infinite. When the position of the node is changed by means of the coupling element 18, 19, the eigenfrequency of the measuring tube 7*a*, 7*b* changes accordingly. The differences in the eigenfrequencies of the flow meters 2, 3 are adjusted simply by arranging the coupling elements 18, 19 in the one flow meter 2 at the positions indicated in FIG. 2 and those same coupling elements 18, 19 in the other flow meter 3 somewhat closer to the anchor 17. Otherwise the same identical flow meters can be used, that is, the measuring tubes 7*a*, 7*b* and the chassis 4, 5 can be practically identical.

The measuring tubes 7*a*, 7*b* are provided with the mounts 8', 8" for the sensors 8 and the mount 9' for the driver 9.

Figure 3:
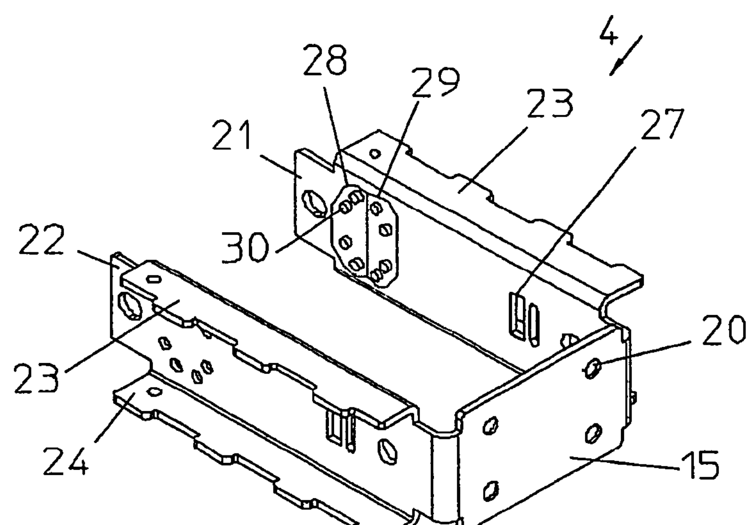
FIG. 3 depicts a housing section of a flow meter.

FIG. 3 shows the chassis 4 with the base 15. The base 15 has four holes 20 through which the ends 13*a*, 13*b*, 14*a*, 14*b* of the measuring tubes 7*a*, 7*b* are threaded. Two sides 21, 22 extend practically symmetrically from the base 15, such that they are substantially aligned in a U-shape relative to the base 15. Each side 21, 22, in turn, has a U-shaped cross section, i.e., it has outwardly angled projecting parts 23, 24 to give the chassis 4 additional stability. The sections 23, 24 further make it possible to mount the otherwise identical chassis 4, 5 to the mounting plates 25, 26. The mounting plates 25, 26 are in turn fixed to the common housing, here the front plate 6. The anchor 17 is thus fixed to the chassis 4. The chassis 4 is fixed to the mounting plate 26, which is in turn fixed to the front plate 6 that forms part of the common housing.

The sides 21, 22 are provided with recesses 27 in which the anchor 17 can be mounted.

Figure 4:
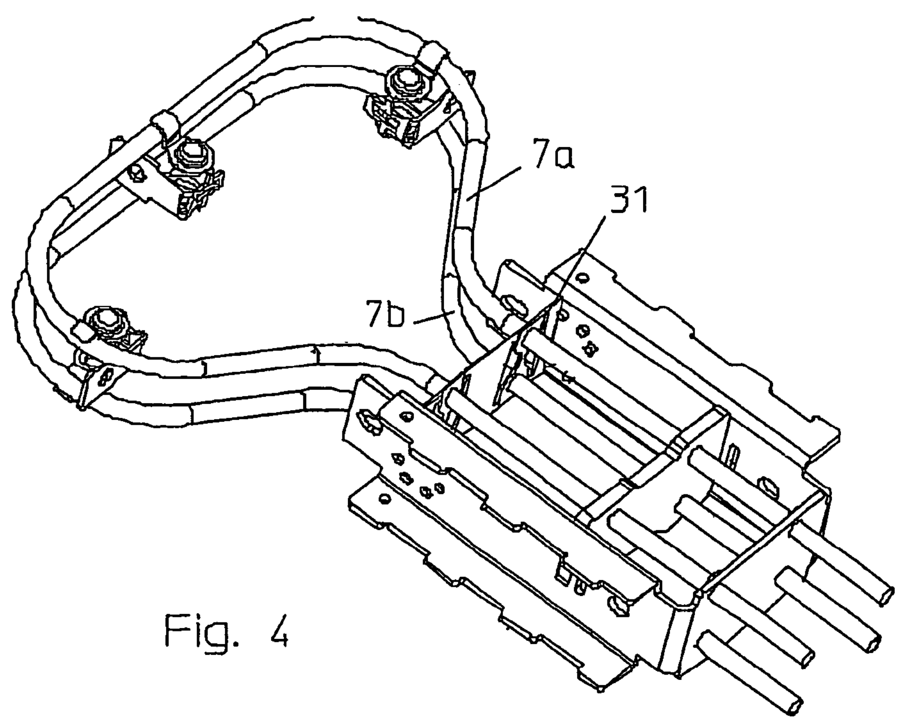
FIG. 4 illustrates a flow meter during assembly.

In their end regions, the two sides 21, 22 have two groups 28, 29 of projecting parts 30. These projecting parts are arranged to form the corner points of a trapezoid as seen in the top view. The plates 31 can therefore be inserted between the front and the rear projecting parts of a group (FIG. 4). Thus, the position of the plate 31 within the chassis 4 is determined by the selection of a group 28, 29 of projecting parts 30. If, as shown in FIG. 4, the projecting parts of the group 28 are selected for the positioning of the plate 31, then the flow meter has a frequency f. If, on the other hand, the projecting parts 30 of the group 29 are selected for the plate 31, then the eigenfrequency is f'. The distance between the two possible positions of the plate 31 is approximately 1 cm, which results in an eigenfrequency difference of 10 Hz. The frequency f is preferably 130 Hz and the frequency f' 140 Hz. The essential factor determining the eigenfrequency is the distance between the position of the plate 31 and the tip of the loops of the tubes.

Figure 5:
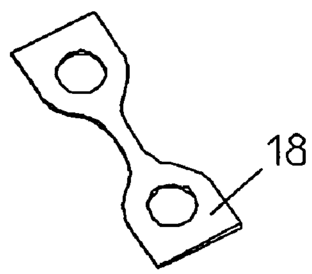
FIG. 5 shows a coupling element.
Figure 6:
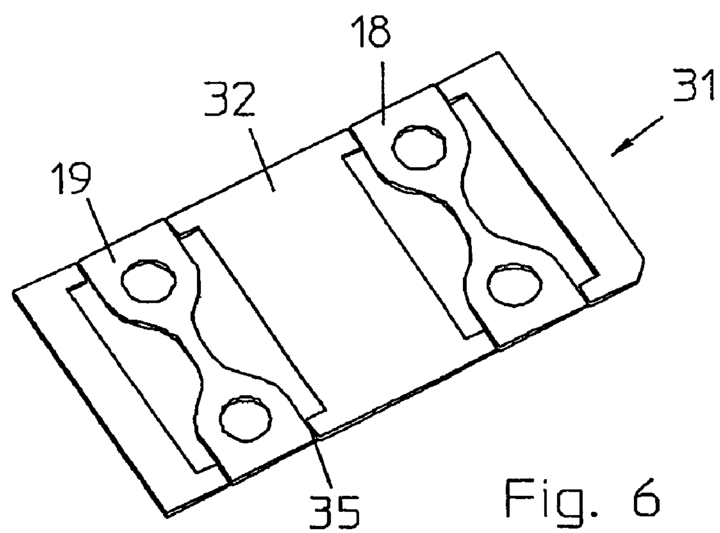
FIG. 6 depicts a mounting plate containing a coupling element.
Figure 7:
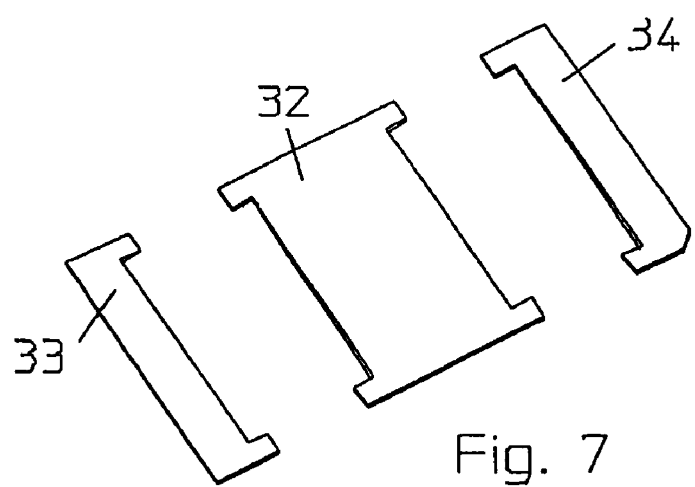
FIG. 7 shows the rest of the mounting plate.

FIGS. 5 to 7 show the auxiliary means used to mount the coupling elements 18, 19 at the correspondingly selected positions on the measuring tubes 7*a*, 7*b*. FIG. 5 shows a coupling element 18, which prior to assembly forms part of the plate 31 shown in FIG. 4. The plate 31 has a central element 32 and two lateral elements 33, 34, which are connected with the two coupling elements 18, 19 via rated break points 35.

The plates 31 are pushed over the measuring tubes 7*a*, 7*b*. They can then be inserted between the projecting parts 30 of the one group 28 or the other group 29. This determines the position of the coupling elements 18, 19 on the measuring tubes 7*a*, 7*b*. The coupling elements can then be connected, e.g., soldered or glued, to the measuring tubes 7*a*, 7*b*. The rest of the plate 31, i.e., the central section 32 and the lateral sections 33, 34 can then be removed.

The other flow meter 3 is basically constructed in the exact same way. The only difference is that the plate 31 is inserted between the projecting parts 30 of the other group 29. The eigenfrequency differences thus generated are sufficient so that the two chassis 4, 5 can be interconnected. The direct connection of the two flow meters 2, 3 provides an excellent mechanical coupling between the two chassis 4, 5, but is unproblematic when the above-described solution is used. The eigenfrequencies of the flow meters 2, 3 differ sufficiently so that crosstalk interference with the measurement results can be avoided.

Once the front plate 6 has been mounted to the mounting plate 26 and the base 15 of the two chassis 4, the differential flow meter depicted in FIG. 1 is nearly completed. It only needs to be inserted into a housing, e.g., into an aluminum housing.

It is of course also possible to use other markings in the chassis 4 instead of the projecting parts 30. In some cases it is even sufficient to simply mark or in some other way indicate the position where the coupling elements 18, 19 are to be mounted in the one flow meter 2 or the other flow meter 3. However, the use of structures makes the assembly easier.

As an alternative to the above-described device, in which a vibration-influencing device is disposed at different positions on the two measuring tubes, a point mass can be used as a vibration-influencing device, which is provided at the same location on both measuring tubes 7, 10. The two point masses may differ with respect to their mass, however. Instead of point masses other additional masses may of course also be used.

Strain gauges may be fixed to the coupling elements 18, 19. The strain gauges register the relative change in length of the coupling elements 18, 19. This change can be used as the measure for the mass flow. In this case, the sensors 8' and 8" can be eliminated. An additional advantage is that this type of measurement using strain gauges includes a differential measurement of the curvatures of the measuring tubes 7, 10. This measurement is therefore insensitive to the flow direction.

The flow meter device consisting of two individual Coriolis flow meters is controlled by a joint main control unit (not depicted). This main control unit is arranged within the common housing and has two electronic control units, one for each flow meter. The control units can be arranged on the same printed circuit board. In this case, however, the printed circuit board is divided into two completely separate sections, such that each section controls one Coriolis flow meter. The control units can of course also be arranged on different printed circuit boards.

In addition, the two control units monitor each other by means of a monitoring device or circuit. If the one control unit fails, the other control unit takes over the control and measurement of the flow meter. This ensures a reliable operation even in differential flow measurements, which have to meet particularly high standards.

The above description of the preferred embodiments has been given by way of example. From the disclosure given, those skilled in the art will not only understand the present invention and its attendant advantages, but will also find apparent various changes and modifications to the structures disclosed. It is sought, therefore, to cover all such changes and modifications as fall within the spirit and scope of the invention, as defined by the appended claims, and equivalents thereof.

What is claimed is:

1. A device comprising:

a first flow meter, working according to Coriolis principle, said first flow meter including a first measuring tube;

a second flow meter, working according to Coriolis principle, said second flow meter including a second measuring tube;

said first flow meter and said second flow meter being disposed in a common housing and said first flow meter and said second flow meter having different eigenfrequencies because of a first vibration-influencing device attached to the first flow meter and a second vibration-influencing device attached to the second flow meter.

2. The device of claim 1, wherein the first vibration-influencing device is located at a relative position different from a relative position of the second vibration-influencing device.

3. The device of claim 2 wherein at least one of the first and the second vibration-influencing devices is configured as a passive device.

4. The device of claim 2 wherein the first and the second flow meters have similar structures except for the first and the second vibration-influencing devices.

5. The device of claim 2 wherein the first and the second measuring tube each has at least two loops, the two loops in the first measuring tube being interconnected by at least a first coupling element that forms the first vibration-influencing device, the two loops in the second measuring tube being interconnected by at least a second coupling element that forms the second vibration-influencing device.

6. The device of claim 5, wherein a third and a fourth coupling elements are provided for the first and the second measuring tubes, respectively.

7. The device of claim 6, wherein the coupling elements on each measuring tube are arranged equidistantly from the ends of the respective measuring tube.

8. The device of claim 5, wherein the coupling elements are plates and the corresponding measuring tubes are aligned perpendicularly to the plate.

9. The device of claim 8, wherein the plates are fixed relative to a first chassis corresponding to the first flow meter and a second chassis corresponding to the second flow meter, wherein the plates corresponding to the first flow meter are fixed at a first locating position on the first chassis and the plates corresponding to the second flow meter are fixed at a second locating position on the second chassis.

10. The device of claim 9, wherein the first and the second locating positions are defined by structures on the first and the second chassis, respectively.

11. The device of claim 10, wherein the plates are configured to be inserted into the corresponding structures.

12. The device of claim 10, wherein the first and the second locating positions are defined by at least three projecting parts each located in the first and the second chassis, said projecting parts protruding toward the first and the second measuring tubes respectively.

13. The device of claim 9, wherein the first and the second locating positions are spaced apart from each other by a distance on the order of one centimeter.

14. The device of claim 5, wherein a respective strain gauge is disposed on each of the first and the second coupling elements.

15. The device of claim 1, wherein the first flow meter has a first electronic control unit and the second flow meter has a second electronic control unit, wherein the first and the second electronic control units monitor each other.

* * * * *